(No Model.)
J. VICTOR.
LUNCH BOX.
No. 548,679.  Patented Oct. 29, 1895.
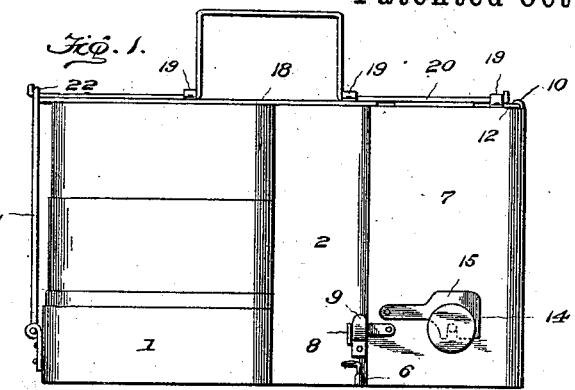
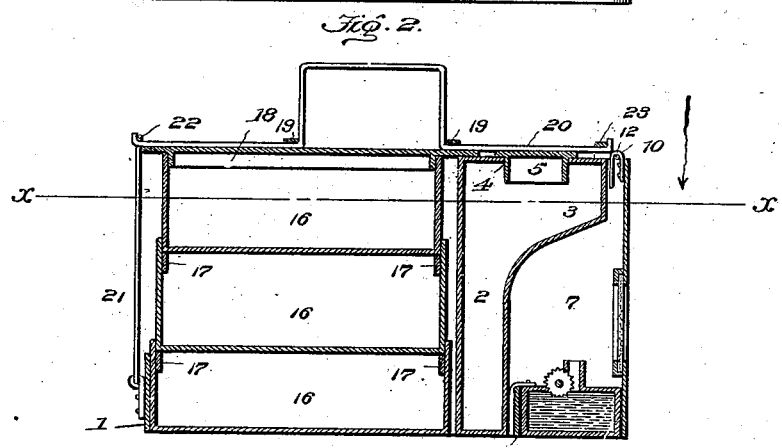
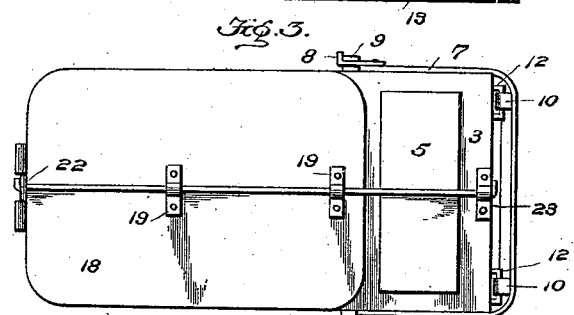
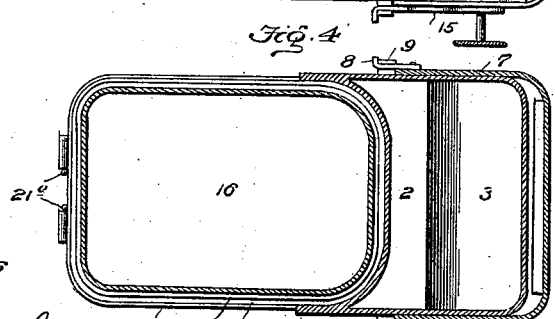
Witnesses
Wm. C. Dashiell
Bruce D. Elliott
Inventor
Jacob Victor
By Benj. G. Cowl
Atty.

UNITED STATES PATENT OFFICE.

JACOB VICTOR, OF WINONA, MINNESOTA.

LUNCH-BOX.

SPECIFICATION forming part of Letters Patent No. 548,679, dated October 29, 1895.

Application filed May 11, 1895. Serial No. 548,955. (No model.)

*To all whom it may concern:*

Be it known that I, JACOB VICTOR, a citizen of the United States, residing at Winona, in the county of Winona and State of Minnesota, have invented certain new and useful Improvements in Lunch-Boxes; and I do hereby declare the following to be a full, clear, and exact description of the invention, such as will enable others skilled in the art to which it appertains to make and use the same.

My invention relates to lunch-boxes combining in their structure a base, a series of removable trays for containing food, a coffee-receptacle, a lamp, and a bale for holding the different parts in place and also serving as a handle.

The invention consists in the novel construction and combination of parts hereinafter fully described and claimed.

In the accompanying drawings, Figure 1 is a side elevation of a dinner-pail or lunch-box constructed in accordance with my invention. Fig. 2 is a central longitudinal section of the same. Fig. 3 is a plan view. Fig. 4 is a horizontal section on the line $x\,x$, Fig. 2.

In the said drawings the reference-numeral 1 designates a rectangular frame constituting the base of the pail or box. Located in this frame at one end is a coffee-receptacle 2, consisting of a vertical box provided at its upper end with an outwardly-projecting extension 3, having a filling-opening 4, closed by a stopper 5. The vertical portion of this receptacle near its lower end is provided with a faucet or drawing-off cock 6. Connected with the said receptacle is a casing 7, the sides of which overlap the sides of the receptacle, and said sides provided with pivoted hooks 8, which engage with lugs 9 on said receptacle. The upper part of the casing is provided with hooks 10, which engage with lugs 12 on the said receptacle, and there is a space between the upper edge of the receptacle and the casing forming a passage for the escape of the products of combustion. This casing, in connection with said receptacle, forms a lamp-chamber, and near its lower end is provided with a bail 13, in which the lamp is seated. At its front the said casing is provided with a sight-opening covered by an isinglass cover, and on one side is provided with an opening 14, through which the wick-regulating rod passes and through which a match may be inserted to light the lamp. This opening is closed by a pivoted plate 15.

The numeral 16 designates a series of trays or pans superimposed upon one another. These trays are flared outwardly at their upper ends and provided on their inner sides with ribs 17, forming seats for the trays.

The numeral 18 designates a cover for the uppermost tray, provided on its upper side with bearings 19 for a bail or yoke 20, which is journaled therein and which serves as a handle. One end of this bail engages with a catch 21, which consists of a piece of wire bent at its center to form a loop 22 and arms 21ª. The lower ends of these arms are bent outwardly and pivotally connected with the frame. The other end of the yoke passes over the cover or stopper of the coffee-receptacle and serves to hold the same in place, and is journaled to a lug 23, secured to said receptacle.

The manner of using the device is as follows: Coffee or other liquid is placed in the coffee-receptacle and food is placed in the trays. The lowermost tray is then placed on the frame and the other trays superimposed therein, the ribs holding said trays in place, and the cover is placed on the top tray. The casing is then secured in place and the lamp lighted. The catch is then engaged with the yoke or bail and the cover held securely in place and the trays or pans prevented from being disengaged from each other. By disengaging the catch the cover and bail can be removed, so as to allow the trays to be removed from the frame.

A dinner-pail or lunch-box constructed as above will be found very efficient in use, keeping the food hot, and the liquid or coffee receptacle being interposed between the trays and the lamp there is no danger of the food being scorched or burned.

Having thus fully described my invention, what I claim is—

1. In a dinner pail or lunch box, the combination with the frame, the superimposed food trays, the coffee receptacle having an extension at its upper end and the lugs secured to said receptacle, of the lamp casing, having hooks engaging with said lugs, and so located as to form a space between its upper end and said extension, the bail secured to said casing, the lamp seated in said bail, the opening in the side of said casing and the pivoted plate substantially as described.

2. In a dinner pail or lunch box, the combination with the frame, the superimposed food trays, the liquid receptacle, the removable lamp casing and the lamp, of the tray cover the bail or yoke pivotally connected therewith and the catch pivoted to said frame with which one end of said bail or yoke engages, substantially as described.

In testimony whereof I affix my signature in presence of two witnesses.

JACOB VICTOR.

Witnesses:
EDWARD LEES,
CHARLES MULLER.